United States Patent [19]
Koide et al.

[11] 3,838,957

[45] Oct. 1, 1974

[54] APPARATUS FOR CONTINUOUSLY MANUFACTURING POLYVINYL ACETAL POROUS MATERIAL

[75] Inventors: Tohru Koide; Kazutomo Ishizawa, both of Osaka; Takahiro Hattori, Okazaki; Toshio Yamamura, Kobe; Mitsuru Maruya; Shinji Tashiro, both of Sowamachi, all of Japan

[73] Assignee: Kanebo Ltd., Tokyo, Japan

[22] Filed: Apr. 30, 1973

[21] Appl. No.: 355,527

[30] Foreign Application Priority Data
June 17, 1972 Japan................................ 47-60753

[52] U.S. Cl................ 425/174.6, 264/51, 425/224, 425/404, 425/445
[51] Int. Cl............................................. B29d 27/00
[58] Field of Search.......... 425/4 C, 817 C, 72, 329, 425/404, 445, 71, 224, 174.6, 325, 327, 328, 371; 264/49, 50, 47, 51

[56] References Cited
UNITED STATES PATENTS

| | | | |
|---|---|---|---|
| 2,395,920 | 3/1946 | TeGrotenhuis | 425/329 X |
| 3,048,888 | 8/1962 | Shockley et al. | 425/224 X |
| 3,276,072 | 10/1966 | Politzer et al. | 425/174.6 X |
| 3,382,303 | 5/1968 | Stieg | 425/404 X |
| 3,497,910 | 3/1970 | Maeda et al. | 425/404 X |

Primary Examiner—R. Spencer Annear
Assistant Examiner—Mark Rosenbaum
Attorney, Agent, or Firm—Armstrong, Nikaido & Wegner

[57] ABSTRACT

Polyvinyl acetal porous material is continuously manufactured from a reaction liquid material containing polyvinyl alcohol, starch, aldehyde and acid catalyst by an apparatus comprising a conveyer chain circulating along a closed path; a plurality of U-shaped unit members secured to the conveyer chain, and joinable with each other to form a horizontal reaction trough for receiving the reaction liquid material, and each of said members being provided with an inner bottom and a pair of inner side walls made of an insulating material, on which walls at least one pair of electrodes facing each other are disposed; a feed conduit for feeding the reaction liquid material onto an entrance portion of the reaction trough; a plurality of pairs of brushes brought into slidable contact with the electrodes of the U-shaped unit members coming to the entrance portion of the reaction trough, and; means for applying a voltage to the brushes, including at least one voltage source, whereby the reaction liquid material is heated by Joule heat generated therewithin.

18 Claims, 23 Drawing Figures

APPARATUS FOR CONTINUOUSLY MANUFACTURING POLYVINYL ACETAL POROUS MATERIAL

The present invention relates to an apparatus for continuously manufacturing polyvinyl acetal porous material, particularly, relates to an apparatus for continuously manufacturing, within a relatively short time, polyvinyl acetal porous material such as belts and sheets, having a uniform quality in porosity and pore size.

Generally, the polyvinyl acetal porous material is produced by heating a reaction liquid material containing polyvinyl alcohol, starch as a pre-forming agent, an aldehyde compound to be reacted with th polyvinyl alcohol and a mineral acid as a reaction catalyst, in water at a temperature of 40° to 90°C for 4 to 40 hours. The reaction proceeds as follows:

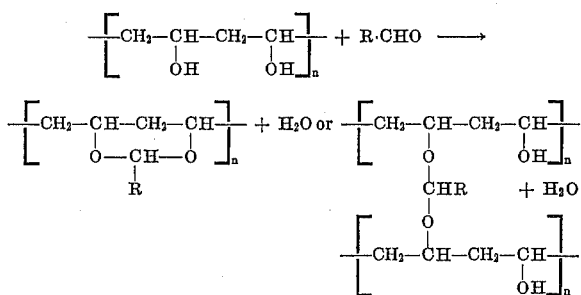

wherein R·CHO is an aldehyde compound and $n$ is a degree of polymerization.

In one conventional process, the reaction is effected in a batch system where the reaction liquid material is charged into a container having a desired shape and then externally heated with a heating medium such as hot air, steam and hot water flowing around the container, electric heater or infrared rays. In the other conventional process, the reaction is effected in a continuous system wherein the reaction liquid material is fed onto a conveyer belt circulating along a closed path and externally heated in the same manner as in the batch system. The external heating tends to produce a non-uniform quality in the resulting porus material. In the external heating, the heat is successively transferred from the outermost portion of the container to the center portion. Accordingly, at an early stage of heating, the outermost portion is higher in temperature than the center portion. This difference of temperature causes non-uniform reaction of the reaction liquid material in the container. According to the results of studies by the inventors, the reaction includes an introductory stage in which the reaction system is raised to the reaction temperature and no reaction takes place, a reaction nucleus formation stage in which a plurality of reaction nuclei, from which the reaction starts, are formed in the reaction system, and a reaction advancing stage. In the reaction nucleus formation stage, the number of nuclei depends on the temperature of the reaction system. That is, the higher the temperature of the reaction system, the larger the number of the reaction nuclei formed. If the reaction system is not uniform in temperature, the number of reaction nuclei in the higher temperature portion is larger than that in the lower temperature portion of the reaction system. In the polyvinyl acetal forming reaction, the polyvinyl alcohol which is dissolved in water, that is, combined with numerous water molecules and thus having a relatively large volume, is converted to the hydrophobic polyvinyl acetal. This hydrophobic polyvinyl acetal is combined with practically no water molecules, that is, it is deposited from the reaction liquid material, and thus has a volume smaller than that of the polyvinyl alcohol. This conversion results in formation of numerous pores in the deposited polyvinyl acetal. The pore size depends on the number of reaction nuclei. That is, the larger the number of reaction nuclei, the smaller the pore size: the smaller the number of reaction nuclei, the larger the pore size. Accordingly, non-uniform temperature of the reaction liquid material in the container results in non-uniformity of porosity and pore size of the resultant polyvinyl acetal porous material. In the conventional process, there is a tendency for the outermost portion of the resulting porous material to have a lower porosity and pore size than those of the center portion of the resultant porous material.

In order to avoid non-uniform distribution of temperature in the reaction system, it is effective to externally heat it by raising the temperature at a very slow rate. However, this results in an industrial disadvantage of prolonged reaction time.

The heating for the reaction liquid material may be internally effected by Joule heat generated therewithin by applying a voltage to the reaction liquid material. The internal heating may be effected not only in the batch system but also in the continuous system.

For example, there is an apparatus for continuously producing a porous material, which comprises an annular reaction trough and a device for applying a voltage to the reaction liquid mixture fed into the annular trough. In the annular trough of the apparatus, the outside periphery has a larger circumference than that of the inside periphery. The difference between the circumferences results in difference between the reactive liquid mixture temperatures at the outside and inside peripheries. The temperature difference, of course, results in non-uniform quality of the resultant porous material.

An object of the present invention is to provide an apparatus and process for continuously manufacturing polyvinyl acetal porous material of a uniform quality.

The apparatus of the present invention comprises, in combination, a conveyer chain circulating along a closed path; a plurality of U-shaped unit members secured to the conveyer chain, and joinable with each to form a horizontal reaction trough at a portion of the closed path, each U-shaped unit member being provided with an inner bottom and a pair of inner side walls made of an insulating material, on which walls at least one pair of electrodes facing each other are disposed; a feed conduit connected to a reaction liquid material supply source and opening at an entrance end portion of the reaction trough; a plurality of pairs of brushes being in slidable contact with the electrodes of the U-shaped unit members arriving at the entrance portion of the reaction trough, and; means for applying a voltage to the brushes, including at least one voltage source.

The process of the present invention is effected by using the apparatus as mentioned above in the procedure comprising the steps of: forming a horizontal reaction trough by joining a plurality of U-shaped unit members circulating along a closed path; feeding a reaction liquid material consisting of polyvinyl alcohol, a starch, an aldehyde compound and an acid catalyst, onto an entrance portion of the reaction trough; uniformly heating the reaction liquid material in the reaction trough at a temperature of 40° to 90°C, by Joule heat generated by applying a voltage to at least a portion of the reaction liquid material, whereby the reaction liquid material is convereted to a polyvinyl acetal porous material; and delivering the resultant porous material from the reaction trough.

The reaction liquid material contains polyvinyl alcohol, starch as a pore-forming agent, an aldehyde compound to be reacted with the polyvinyl alcohol and a mineral acid as a reaction catalyst in water. The polyvinyl alcohol usable for the present invention preferably has a degree of polymerization from 500 to 3,000 and a saponification percentage from 80 to 100. The polyvinyl alcohol may be a mixture of ones varying in the degree of polymerization or the percentage of saponification. Also, the polyvinyl alcohol may be a copolymer with a different monomer. The starch as a pore-forming agent may be selected from potato starch, sweet potato starch, rice starch, wheat starch, maize starch and functional derivatives of the above stated starches. The aldehyde compound usable for the present invention may be selected from formaldehyde, acetaldehyde, butylaldehyde, nonylaldehyde, benzaldehyde and glyoxal. Usually, formaldehyde is suitable for the process of the present invention in consideration of prices and reaction property. However, sometimes, the nonylaldehyde and benzaldehyde are utilized for special uses. The mineral acid to be used as the reaction catalyst may be selected from sulfuric acid, phosphoric acid, hydrochloric acid and acetacetic acid.

In the preparation of the reaction liquid material, the polyvinyl alcohol is dissolved, at a high temperature, in water to produce a concentration of 4 to 18 percent by weight and the solution is mixed with an aqueous dispersion or colloidal solution of the starch in an amount of 10 to 200 percent, based on the weight of the polyvinyl alcohol in water. In the case where the aqueous dispersion of starch is mixed with the polyvinyl alcohol solution, the mixture is heated while stirring to gelatinize the starch, and allowed to cool to a temperature lower than 40°C. Thereafter, the cooled mixture is mixed with an aqueous solution containing the necessary amount of acid catalyst and the aldehyde compound in an amount of 0.5 to 1.2 by mol per 1 mol of the hydroxyl group of the polyvinyl alcohol.

The reaction for converting the polyvinyl alcohol to the polyvinyl acetal is effected at a temperature of 40° to 90°C, preferably, 50° to 80°C, for 4 to 40 hours, preferably, 6 to 20 hours. During the reaction, the polyvinyl alcohol dissolved in water, and thus, having bound water, is converted to polyvinyl acetal having practically no bound water. This conversion results in the deposition of the hydrophobic polyvinyl acetal while forming pores therein. The starch present in the reaction liquid material acts to make the pore size uniform.

The reaction liquid material is internally heated by the Joule heat generated by applying a voltage thereto. The voltage may be in a range from 8 to 100 volts, preferably, 12 to 50 volts. Such voltages generate an electric current flowing through the reaction liquid material in amperes from several to several hundred. The Joule heat thus generated raises the temperature of the reaction liquid material from room temperature to the reaction temperature within several seconds to several hours.

The features and advantages of the present invention are more fully clarified in the following detailed description, especially when read in conjunction with the accompanying drawings.

Figure 1:
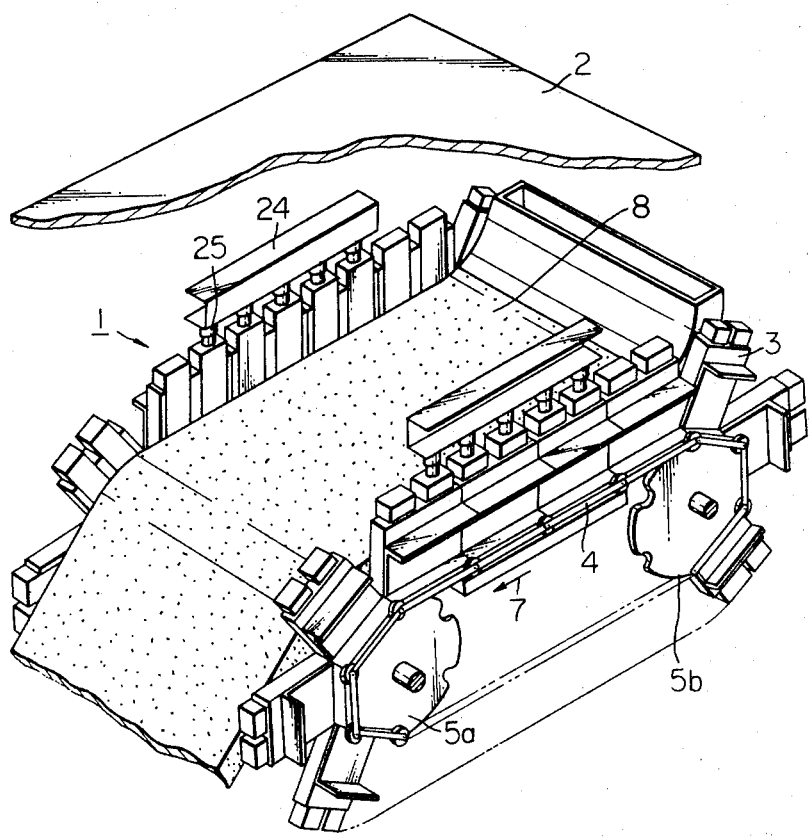
FIG. 1 is a schematic view of an embodiment of the apparatus of the present invention.

Referring to FIG. 1, a continuous reaction apparatus 1 is contained in a housing 2 partially shown in the drawing. The reaction apparatus 1 is provided with a plurality of trough-forming U-shaped unit members 3, a conveyer chain 4, a pair of driving wheels 5a and 5b and a feed conduit 6. The unit members 3 are secured on the conveyer chain 4 forming a closed path around the wheels 5a and 5b. The wheels 5a and 5b are mounted on a frame (not shown in the drawing) of the housing 2. One of the wheels 5a and 5b is connected to a motor (not shown in the drawing) for rotating. By actuating the motor, the conveyer chain 4 is circulated around the wheels 5a and 5b while carrying the unit members 3 in the direction indicated by the arrow 7.

During circulation, when the unit member 3 has left the wheel 5b, it is joined with the adjacent foregoing unit member and then joined with the adjacent following unit member after it has left the wheel 5b.

The joined unit members form a horizontal reaction trough 8 between the wheels 5a and 5b. When the unit member 3 arrives at the wheel 5a, it is separated from the adjacent following unit member.

The feed conduit 6 is disposed above the reaction trough 8, and its lower end opens at an entrance portion of the reaction trough 8. The upper end of the conduit 6 is connected to a supply source (not shown in the drawing) of a liquid material to be fed into the reaction trough 8.

Figure 2:
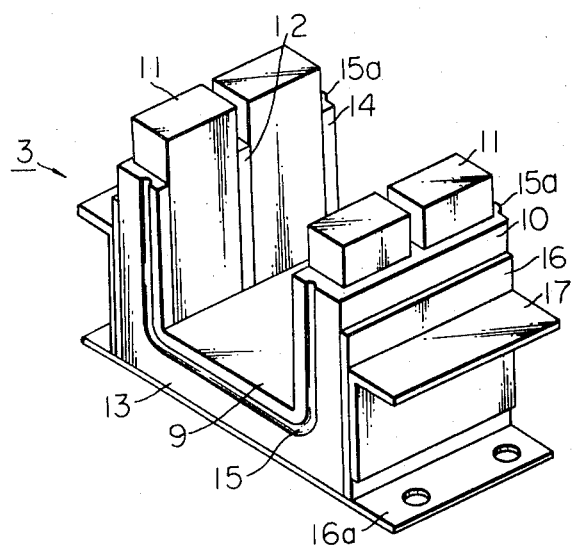
FIG. 2 is a schematic view of an embodiment of a reaction trough-forming unit member in the apparatus of the present invention.

Referring to FIG. 2, the trough-forming U-shaped unit member has a horizontal bottom part 9 having an even inside bottom surface and a pair of vertical side walls 10 facing each other. The inner surface of the bottom part 9 and the side walls are made of an insulating material. The side parts are provided with two pairs of carbon electrodes 11 facing each other and forming inside walls of the side parts. The electrodes disposed on a side part are separated from each other through an insulating insertion 12. The unit member 3 is provided with a packing 13 on its front face and a packing 14 on its back face in relation to the direction of advance of the unit member 3. The front packing 13 has a U-shaped gutter 15 and the back packing 14 has a U-shaped ridge 15a corresponding to the gutter 15.

The unit member 3 is engaged with a combining member 16 through which the unit member 3 is combined with the conveyer chain. Further, a pair of guide members 17 are fixed onto the outside surfaces of the side parts of the unit member 3, and project outwardly.

Figure 3:
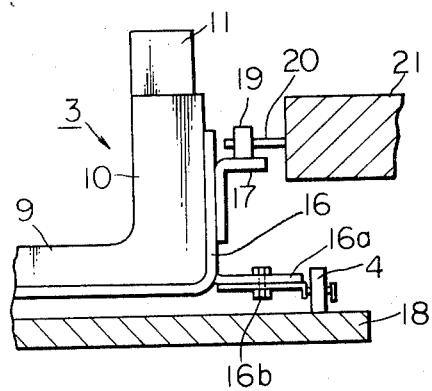
FIG. 3 is a shematic view showing a mechanism combining a unit member with a conveyer chain.

Referring to FIG. 3, the combining member 16 is fixed to the conveyer chain 4, through a joint member 16a thereof, with a fastener 16b.

Figure 4:
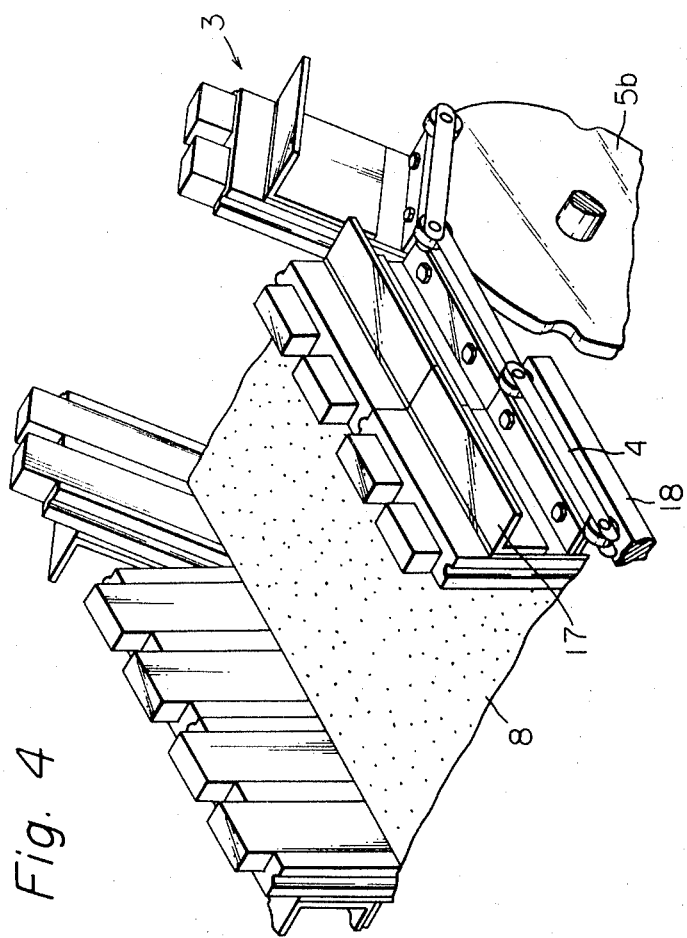
FIG. 4 is a partial schematic view of the unit members forming the reaction trough.

Referring to FIGS. 3 and 4, when the conveyer chain 4 comes to a position at which the unit members 3 form the reaction trough 8, the conveyer chain is put on a guide plate 18, disposed below the reaction trough 8, and advances along th guide plate 18.

In FIG. 3, a plurality of guide rollers 19 are disposed along the length of the reaction trough 8 and each is rotatably supported by a shaft 20 secured on a frame 21 of the housing (not shown in the drawing).

Referring to FIGS. 1 to 4, when a unit member 3 has left the wheel 5b, the portion of the conveyer chain 4 carrying the unit member 3 runs on the guide plate 18 and the guide member 17 of the unit member 3 comes into contact with the guide rollers 19. That is, the unit member 3 is carried by the conveyer 4 while being prevented from up-and-down movement. Accordingly, the gutter 15 of the front packing 13 of the unit member 3 is accurately brought into a position at which the gutter 15 is engaged with the ridge 15a of the back packing 14 of the adjacent foregoing unit member and sealed by the ridge 15a. While running along the guide plate 18, the engagement of the unit members is secured by the guide plate 18, guide members 17 and guide rollers 19 and thus, the engaged unit members form the reaction trough having an even bottom.

Next, when a unit member engages with the wheel 5a, the unit member is smoothly separated from the adjacent following unit member, since the adjacent following unit member is secured by the guide plate 18, guide roller 19 and guide member 17 and prevented from up-and-down movement.

In order to secure the unit members, the portion of the conveyer 4 running on the guide plate 18 may be secured by a pertinent device to avoid up-and-down movement.

The front and back packings of the unit member are preferably made of an elastic insulating material having a high resistance to chemicals, especially acids. The elastic insulating material may be selected from polyethylene, polypropylene, natural and synthetic rubbers and polytetrafluoroethylene. Particularly, spongy butadien acrylonitrile rubber is suitable for the packings.

Figure 5:
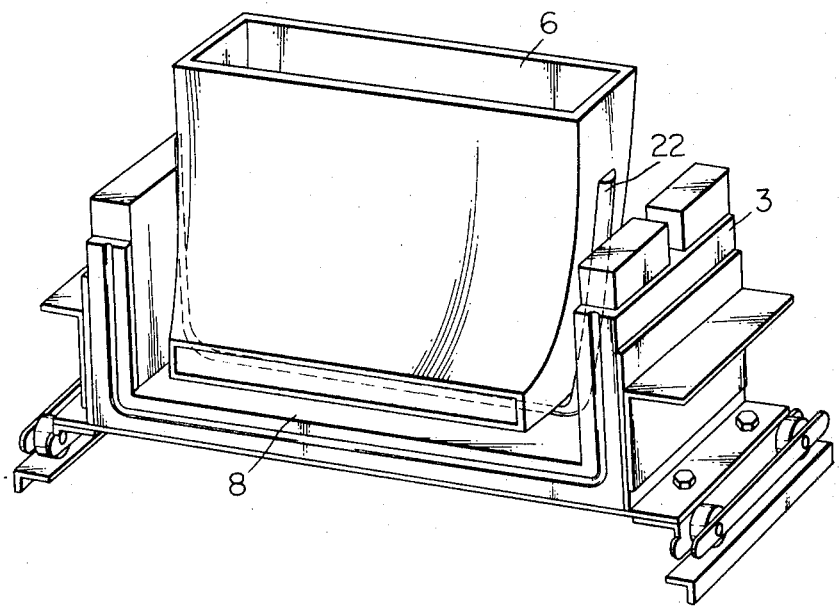
FIG. 5 is a partial schematic view of a reaction liquid material feed conduit disposed at the reaction trough.

Referring to FIG. 5, the conduit 6 is provided with a U-shaped packing 22 fixed on the outside surface of the lower end portion thereof. The packing 22 slidably seals the clearance between the outside surface of the lower end portion of the conduit 6 and the inside surface of the unit member located at the entrance of the reaction trough 3. The packing 22 is effective to obstruct out-flow of the liquid material fed into the reaction trough 8, through the entrance.

Referring to FIG. 1, a plurality of brushes 23 are arranged above the carbon electrodes 11 of the unit members 3 which form the reaction trough 8. The brushes are fastened at their upper ends to a support member 24, each through a holder 25. The support member 24 is connected to an electric source (not shown in the drawing) to apply a voltage. The lower ends of the brushes 23 come into slidable contact with upper ends of the carbon electrodes 11. When a voltage is applied between a pair of carbon electrodes 11 facing each other, the liquid material existing between the electrodes 11 is uniformly heated by Joule heat generated by electric current flowing therethrough.

Therefore, the liquid material is uniformly raised to a temperature at which it is converted to porous polyvinyl acetal product. Such uniform temperature of the liquid material results in a uniform quality of the porous polyvinyl acetal product.

The continuous reaction apparatus 1 may be disposed within a closed housing. The closed housing may be provided with means for flowing hot air of a desired temperature around the reaction trough. Such hot air flow is effective to heat the liquid material fed into the reaction trough to a predetermined temperature, uniformly and rapidly, and to maintain it at that temperature for a desired time.

By utilizing the apparatus as shown in FIGS. 1 through 5, th polyvinyl acetal porous sheet is produced by the following process. A reaction liquid material, consisting of a mixture of polyvinyl alcohol, starch as a pore-forming agent, aldehyde to be reacted with the polyvinyl alcohol and acid catalyst in water, is fed from a supply source (not shown), through the lower end opening of the conduit 6 into the horizontal reaction trough 8 formed by a plurality of the unit members 3 circulating along the closed path around the wheels 5a and 5b. The reaction liquid material thus fed is prevented by the packing 22 from flowing out through the clearance between the outside surface of the lower end portion of the conduit 6 and the inside surface of the unit member 3 positioned at the entrance of the reaction trough 8. Also, the fed reaction liquid material is prevented from flowing away through the reaction trough 8 by the solidified liquid material which has been fed previously. Therefore, the fed reaction liquid material fills an upstream portion of the reaction trough 8, and advances, carried by the unit members 3, along the reaction trough 8. When the unit member carrying the reaction liquid material reaches a position at which the carbon electrodes 11 comes into contact with the brush 23, a predetermined voltage is applied between a pair of the electrodes 11 facing each other. This causes the uniform generation of Joule heat in the reaction liquid material located between the electrodes. Therefore, the reaction liquid material is heated while the electrodes of the unit member carrying it, keep contact with the brush 11. After heating for a predetermined time, the reaction liquid material is raised to the temperature at which the aldehyde catalitically reacts with the polyvinyl alcohol in the liquid material, and is maintained at that temperature for a predetermined period while advancing along the reaction trough 8. When the unit member 3 reaches the downstream portion of the reaction trough 8, the reaction liquid material carrier by the unit member 3 is converted to the polyvinyl acetal porous sheet.

In the process mentioned above, it is known that the reaction liquid material located at the boundary zone, between a portion at which the voltage is applied and a portion at which the voltage is not applied, is locally over-heated owing to the so-called edge overheat phenomenon. The edge overheat phenomenon results in a non-uniform quality of the product. The larger the applied voltage, the larger the edge overheat of the liquid material. In order to decrease the overheat, it is preferable to apply the voltage by the following methods.

Figure 6:
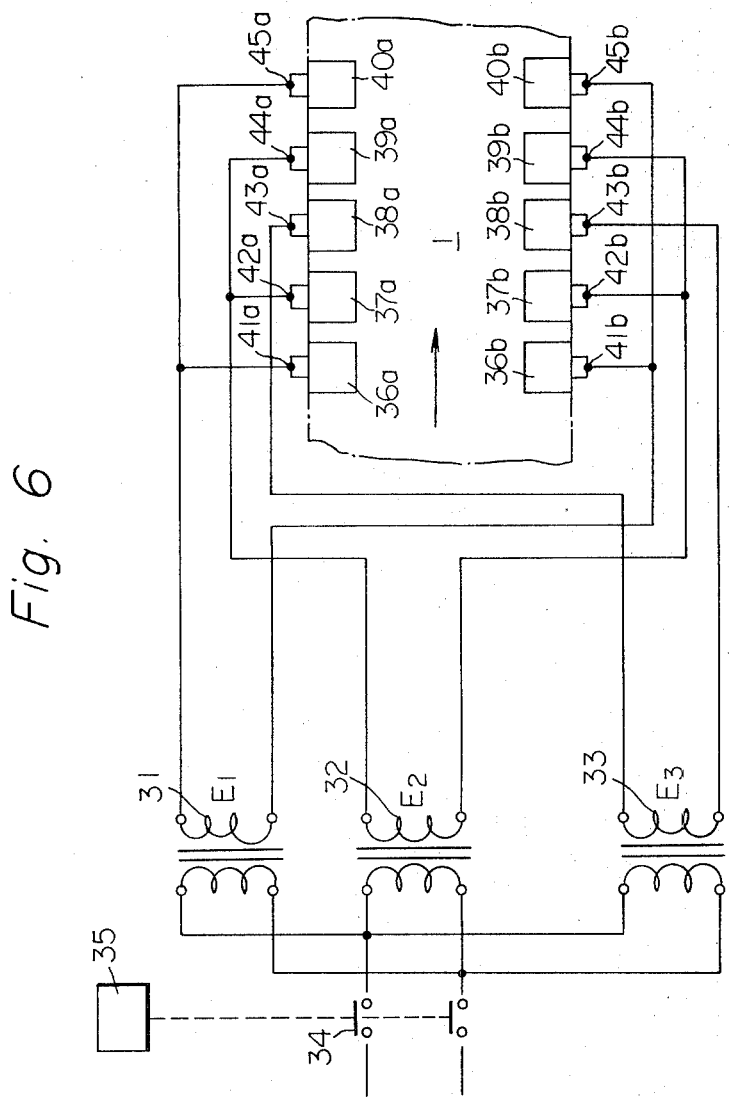
FIG. 6 is a diagram showing an embodiment of a circuit for applying voltage.

Referring to FIG. 6, three transformers 31, 32 and 33 are connected to an A.C. source (not shown in the drawing) through a switch device 34, which is controlled by a control device 35 in accordance with a predetermined program. When the switch device 34 is switched on, the secondary sides of the transformers 31, 32 and 33, are transformed at voltages $E_1$, $E_2$ and $E_3$, respectively. The transformer 31 is connected to two pairs of brushes 41a and 41b, and 45a and 45b so as to apply the voltage $E_1$ between electrodes 36a and 36b and 40a and 40b, respectively, connected with the brushes as mentioned above. The transformer 33 is connected to a pair of brushes 43a and 43b so as to apply the voltage $E_3$ between electrodes 38a and 38b. Also, the transformer 32 is connected to two pairs of brushes 42a and 42b and 44a and 44b so as to apply the voltage $E_2$ between electrodes 37a and 37b and 39a and 39b.

Provided $E_1 < E_2 < E_3$, the largest Joule heat is generated in the highest voltage $E_3$ portion located between the electrodes 38a and 38b, the smallest Joule heat in the lowest voltage $E_1$ portions located between the electrodes 36a an 36b and 40a and 40b, and a middle Joule heat in the middle voltage $E_2$ portions located between the electrodes 37a and 37b and 39a and 39b. That is, the highest voltage $E_3$ portion is arranged between the middle voltage $E_2$ portions with a relatively small differential voltage ($E_3 - E_2$), and the middle voltage $E_2$ portions are arranged adjacent to the lowest voltage $E_1$ portions with a relatively small differential voltage ($E_2 - E_1$). Those small differential voltages cause very small edge overheat phenomena at the boundary zones between the highest voltage portion and the middle voltage portion, and the middle voltage portion and the lowest voltage portion. Further, the portions without voltage are adjacent to the lowest voltage $E_1$ portions. Accordingly, the boundary zone between them has a very small edge overheat phenomenon. The small edge overheat phenomena at the boundary zones result in uniform heating of the liquid material and thus, in uniform quality of the reaction product.

Figure 7:
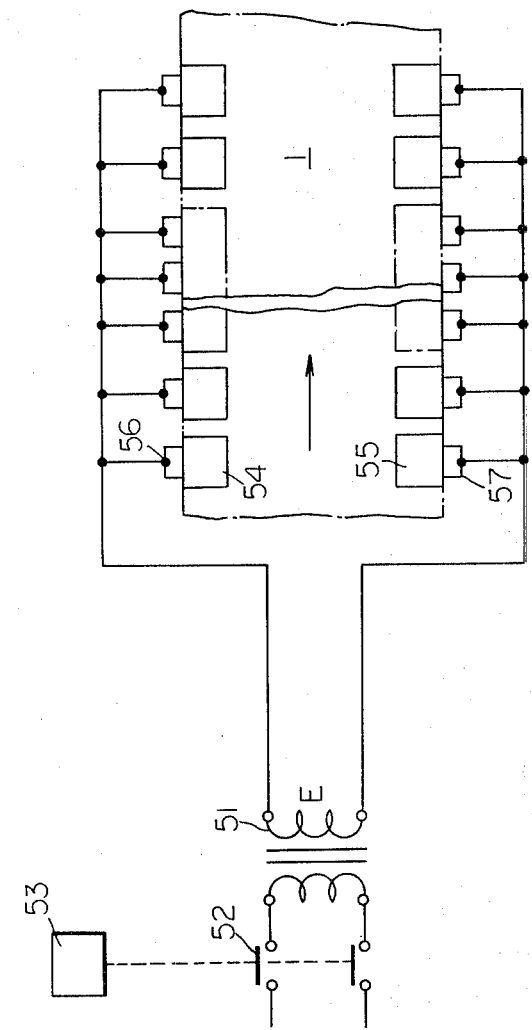
FIG. 7 is a diagram showing another embodiment of a circuit for applying voltage.

Referring to FIG. 7, a transformer 51 is connected at its primary side to an A.C. source (not shown in the drawing) through a switch device 52 which is controlled by a control device 53 in accordance with a predetermined program. The secondary side of the transformer 51 is connected to $n$ pairs of brushes 54 and 55 arranged along an upstream portion of the reaction trough. The brushes 54 and 55 come into slidable contact with n pairs of electrodes 56 and 57 of the unit members. When the switch device 52 is switched on, a voltage E is applied between n pairs of electrodes 56 and 57. Generally, when a voltage is applied to an electrode, an induction voltage is generated at the electrode to which voltage is not applied. This induction voltage is somewhat effective in reducing the edge overheat phenomenon in the boundary zone. In this case, the larger the number $n$ of electrodes, the larger the induction voltage. A large induction voltage results in a small edge overheat phenomenon.

The heating of the liquid material may be controlled by on-off control of the switch device 52 by the control device 53 in accordance with a predetermined program. On-off control of heating is effective for uniformly raising the liquid material to a predetermined temperature and maintaining it evenly at that temperature for a preset period. Further, the liquid material may be maintained at the predetermined temperature by flowing hot air or steam around the reaction trough. While the liquid material is kept at the elevated temperature, it gelatinizes and then, solidifies to the desired polyvinyl acetal porous product.

The process of the present invention may be effected by utilizing the apparatus as indicated in FIGS. 1 to 6, as follows:

A reaction liquid material to be converted to the polyvinyl acetal porous article is prepared for example, in the following manner. A mixture of 5.0 kg of polyvinyl alcohol, 3.6 kg of starch and 50 litres of water is heated, while stirring, to the boiling point to dissolve the polyvinyl alcohol and to gelatinize the starch; 6.3 litres of 98 percent concentrated sulfuric acid and 7.6 litres of an aqueous solution of 38 percent by weight of formaldehyde is added to the mixture, and then, the reaction mixture is diluted to 100 litres by adding water. The continuous reaction apparatus is contained in a housing made of a heat-insulating material. The inside space of the housing is kept at a temperature of 70°C by hot air flow, using a heater of 5 KW and a blower of a maximum flow rate of 24 m³/min.

The reaction apparatus comprises five pairs of brushes as shown in FIGS. 1 and 6. The lowest voltage, $E_1 = 11$ volts, is applied between the outside brushes 41a and 41b and 45a and 45b, the highest voltage, $E_3 = 16$ volts, between the center brushes 43a and 43b and the middle voltage, $E_2 = 14$ volts, between the intermediate brushes 42a and 42b and 44a and 44b. The conveyer chain 4 is circulated at a velocity of 10 cm/min.

Figure 8:
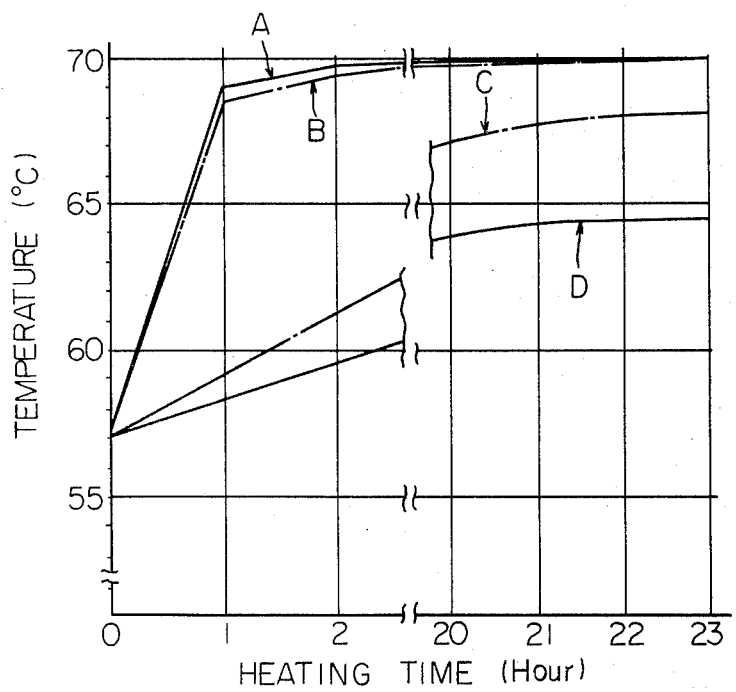
FIG. 8 is a graph showing the relationship between heating time and temperature of the reaction liquid material.

The liquid material as prepared above is fed into the reaction trough 8 through the conduit 6. The liquid material located between the carbon electrodes brought into contact with the brushes, is heated by Joule heat corresponding to the applied voltage. Referring to FIG. 8, curves A and B show the relationship between heating time and temperature of the liquid material located at a center portion of the unit member and a portion close to the electrode, in the case where the liquid material is heated by the Joule heat using the apparatus of the present invention. In the event the liquid material is heated only by hot air of 70°C, the relationship between the heating time and temperatures of the liquid material located at a portion close to the electrode and a center portion of the unit member, are shown in curves C and D, respectively. After leaving the electrical heating zone, the liquid material on the unit member is kept at the desired temperature by flowing hot air or steam around the reaction trough, so as to develop the polyvinyl acetal formation reaction. Accordingly, the liquid material is converted to the polyvinyl acetal porous sheet at the downstream portion of the reaction trough 8.

When the unit member carrying the porous sheet reaches the wheel 5a, it is freed from the combination with the adjacent following unit member at its back face. In this manner, the porous sheet is continuously separated from the unit members and transferred to a washing step and then, to a drying step.

When the polyvinyl acetal is produced by the reaction of the polyvinyl alcohol with the aldehyde, the reaction rate depends on the Arrhenius equation (1):

$$K = Ae^{-E/RT}$$

(1)

wherein $K$ represents a coefficient of reaction rate, A represents a frequency factor, E represents an energy of activation for reaction, R represents the gas constant and T represents an absolute temperature of reaction, that is $e^{-E/RT}$ is the Boltzmann factor. Accordingly, the reaction rate can be estimated by the reaction rate coefficient $K$. Provided $K_{57} = K_o$, wherein $K_{57}$ represents a reaction rate coefficient at a temperature of 57°C in the polyvinyl acetal forming reaction, the following relationships are observed.

$$K_{60} = 1.2K_o \text{ and } K_{69} = 3.4K_o$$

wherein $K_{60}$ and $K_{69}$ represent reaction rate coefficients at temperatures 60°C and 69°C, respectively. Referring to FIG. 7, in the case where the reaction liquid material of an initial temperature of about 57°C is heated by the process and apparatus of the present invention, th portions of the reaction liquid material located at a center portion of the unit member and a portion close to the electrode, are rapidly raised to a temperature of approximately 69°C within about 1 hour, and of approximately 70°C within 3 hours at rates similar to each other. Compared with this, in the case where the reaction liquid material is heated only by hot water of 70°C, since the reaction liquid material located at the center portion of the reaction trough is very slowly raised, it merely reaches temperatures of approximately 58°C and 64°C even after heating for 1 and 23 hours, respectively. In the case of the liquid material located at a portion close to the electrode of the unit member, it merely reaches temperatures of approximately 59°C and 68°C, even after hot water heating for 1 and 23 hours, respectively. That is, the reaction liquid material heated by the process and apparatus of the present invention has a high reaction rate, after heating 1 hour, more than three times that of the reaction liquid material heated only by hot water of 70°C for 1 hour. Further, in view of FIG. 8, it is clear that the reaction liquid material can be uniformly heated by the process and apparatus of the present invention. However, in the case of heating only by hot water, the liquid material is non-uniformly, slowly raised to the desired temperature. This results in a non-uniform quality of the product.

Also, the heating of the reaction liquid material may be carried out by using the voltage application system as shown in FIG. 7 having, for example, 10 pairs of brushes. In the case of voltage application at 12 volts to each pair of brushes, the liquid material is heated in a manner similar to that in FIG. 6.

If the liquid material is heated by the conventional process and apparatus using hot air or steam as a heating medium, 25 hours or longer is required to complete the whole process from feeding of the liquid material to delivering of the resultant porous sheet. Compared with this, the process of the present invention needs only 2 to 8 hours to complete the same process. This results in a highly efficient production of porous sheet having a uniform quality. Further, the reaction trough of the apparatus of the present invention is effective for forming the porous sheet of a uniform width.

The process of the present invention may be effected periodically by intermittently circulating the conveyer chain and applying the voltage during the time the unit members forming the reaction trough are stationary.

In order to shorten the heating period for the liquid material in the reaction trough, the liquid material may be preliminarily heated to a predetermined temperature, close to a temperature at which the polyvinyl acetal-forming reaction takes place, before feeding it into the reaction trough. In this preliminary heating, it is necessary to heat the liquid material uniformly and rapidly. To satisfy this necessity, it is preferable to uniformly heat the liquid material by Joule heat generated within the liquid material itself. In this event, Joule heat is generated by applying a voltage of 8 to 100 volts, preferably, 12 to 50 volts. By the voltage application, a large electric current of several tens to several hundred amperes flows through the liquid material. The Joule heat is generated in an amount corresponding to the electrical resistance of the liquid material, and heats the liquid material uniformly and rapidly to a desired temperature within from several seconds to about 50 minutes, preferably, less than 5 minutes. The tempreature, preferably, is predetermined at 40° to 90°C, which is close to the polyvinyl acetal-forming temperature. If the temperature is higher than 90°C, it is necessary to cool the preheated liquid material to the polyvinyl acetal forming temperature. Also, if the temperature is lower than 40°C, the preheated liquid material needs further heating. This further heating tends to result in non-uniform temperature distribution of the liquid material. Accordingly, the preheating temperature is, preferably, in a range from a temperature higher by about 10°C above the predetermined reaction temperature to a temperature lower by about 15°C, below the predetermined reaction temperature.

As a result of the inventors' study of the polyvinyl acetal forming reaction, it was observed that in the case where the liquid material is raised to and maintained at the predetermined reaction temperature, the polyvinyl acetalforming reaction begins after passing a certain introductory period. The length of the introductory period depends on the reaction temperature. The higher the reaction temperature, the shorter the introductory period and the lower the reaction temperature, the longer the introductory period. For example, provided the reaction temperature is 20°, 40°, 60° or 80°C, the introductory period is longer than several tens of days, 3 to 5 hours, several tens of minutes or 10 to 19 minutes respectively. At the later stage of the introductory period, the liquid material is gelatinized. Accordingly, it is necessary to feed the liquid material to the reaction trough before the gelatinization. Usually, the preheating of the liquid material is practically effected between several seconds and fifty minutes.

In order to effect the preheating, a heating device is disposed between the liquid material supply source and the conduit for feeding it to the reaction trough. For example, a heating device, as shown in FIG. 9, may be inserted between the feed conduit and the supply source of the liquid material.

Figure 9:
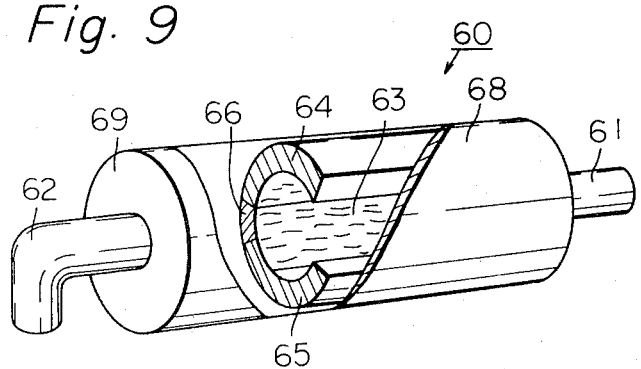
FIG. 9 is a partial cross-sectional schematic view of an embodiment of a preheating device to preheat the reaction liquid material.

Referring to FIG. 9, the preheating device has a cylindrical heater 60, an entrance conduit 61 connected to the supply source of the liquid material (not shown in the drawing) and an exit conduit 62 connected to the feed conduit of the reaction apparatus (not shown in the drawing). The heater 60 is provided with a closed passage 63 connected at the respective ends thereof, to the entrance conduit 61 and the exit conduit 62, and a pair of electrodes 64 and 65 having an arc-shaped lateral cross-sectional profile and facing each other through out the length of passage 63. The electrodes 64 and 65 are insulated from each other by a pair of insulating members 66 and connected to a voltage applying source (not shown in the drawing). When the liquid material is fed into the closed passage 63 and a predetermined voltage is applied between the electrodes 64 and 65, the fed liquid material is uniformly heated by the Joule heat generated by voltage application. The cylindrical heater 60 is covered by a cylindrical cover member 68 and a pair of side cover members 69, each consisting of an insulating material, for example, phenol-formaldehyde resins, epoxy resins, laminated materials composed of the above-mentioned resin layers and fabric or wood layers, polyamides, polyoxymethylenes, polyolefins, glass or ceramics. The insulating cover members may be further covered with a protecting shell consisting of an acid resistant material having sufficient mechanical durability. It is necessary that the electrodes 64 and 65 be made of a material having a high resistance to chemicals included in the liquid material, especially, acid. For example, carbon or stainless steel is suitable for the electrodes.

The electrodes may be divided into a plurality of unit electrodes insulated from each other. In this case, the same voltage may be applied to the divided electrodes in the same manner as shown in FIG. 7. Also, different voltages may be applied to the divided electrodes in the same manner as shown in FIG. 6.

The preheating device may be an open heater device. However, the closed heater device as shown in FIG. 9 is preferable because the closed heater can prevent the evaporation of volatile substances, such as water and aldehydes, from the liquid material.

In order to uniformly heat the liquid material flowing through the passage 63, it is preferable that a stirrer is provided in the passage 63.

Figure 10A:
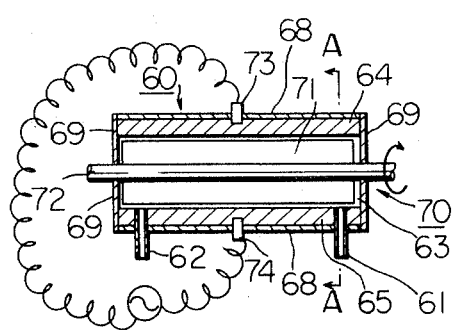
FIG. 10A is a cross-sectional side view of the other embodiment of a preheating device to preheat the reaction liquid material.
Figure 10B:
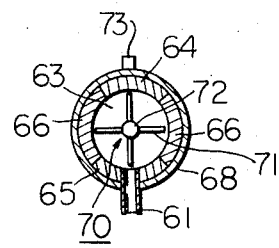
FIG. 10B is a cross-sectional front view of the preheating device of FIG. 10A.

Referring to FIGS. 10A and 10B, the cylindrical heater 60 has a stirrer 70 provided in the passage 63. The stirrer 70 comprises: a rotary shaft 72 connected, at one end, to a motor (not shown in the drawing) and hermetically supported by the side cover members 69, and; one or more, preferably, 4 or 6, of the stirring paddles 71 extending from the rotary shaft 72 towards the inside surface of the passage 63. The rotary shaft may be supported by supporting members disposed outside the heater 60 and the end of the rotary shaft which is not connected to the motor may be terminated in the passage and may or may not be supported by a supporting member disposed in the passage. The paddles may be made of a plane plate or a spiral plate and may extend along the whole length or a part of the length of the longitudinal axis of the rotary shaft. The paddles extending only partially along the rotary shaft, are effective for uniformly stirring the liquid material with a relatively small resistance to flow of the liquid material. The spiral paddles are effective for smoothly transferring highly viscous liquid material through the passage.

The clearance between the terminal end of the paddle and the inside surface of the passage is preferably in the range of 0.1 mm to 10 mm.

In the case the clearance is very small, or practically zero, the paddle can scrape up the liquid material which is in contact with the inside surface of the passage. This is effective for preventing overheating and scorching of the reaction liquid material close to the inside surface of the passage. In this case, the paddle is preferably made of an insulating material.

Referring to FIGS. 10A and 10B, the liquid material is fed from the supply source (not shown in the drawing) into the passage 63 of the heater 60 through the entrance conduit 61 by actuating a pump (not shown in the drawing) disposed between the supply source and the entrance conduit 61. When a voltage is applied to the electrodes 64 and 65, through terminals 73 and 74, and the motor (not shown) connected to the rotary shaft 63 is actuated, the liquid material is heated by Joule heat, while being uniformly stirred by the stirrer 70, and flows towards the exit conduit 62.

As is well known, since the starch tends to gelatinize non-uniformly and transform from a water-soluble α-form to a water-insoluble β-form, it is difficult to prepare a uniform starch colloidal solution. The non-uniform transformation accompanies non-uniform separation of combined water from the starch. Such non-uniform gelatinization and transformation result in non-uniform viscosity and non-uniform pore formation in the solidified polyvinyl acetal product.

However, the preheater as shown in FIGS. 10A and 10B can uniformly dissolve the polyvinyl alcohol and gelatinize the starch in water by controlling the flow rate of the liquid material, rotation rate of the stirrer and the voltage to be applied to the electrodes.

Accordingly, the preheater is suitable for preparing a uniform solution, with a predetermined temperature, from a mixture of polyvinyl alcohol, aldehyde, acid and raw starch in a simple step. In this step, gelatinization of starch, dissolution of polyvinyl alcohol, admixing and preheating are simultaneously performed.

In the conversion of the liquid material to the polyvinyl acetal porous sheet, there is an undesirable tendency for the volume to shrink. This shrinkage results in nonuniformity in porosity and pore size of the resultant porous sheet.

This shrinkage can be prevented by bringing a surface of polar material into contact with the upper surface of the reaction liquid material during the polyvinyl acetal forming reaction.

The polar material may be selected from substances having a high resistance to the chemicals, particularly acid, in the reaction liquid material and a high polarity; for example, metallic substances such as stainless steel and organic substances such as polycarbonate, polyester, polyamide, formaldehyde-treated polyvinyl alcohol, polyvinyl chloride, polyvinylidene chloride, polyurethane, phenol-formaldehyde resin, urea-formaldehyde resin, rubber and mixtures of two or more of the above-mentioned substances. The polar material may be in sheet or plate form, having a smooth or rough surface. Or, the polar material may be in fabric form. Further, the polar material may have a corrugated surface or some other regular or irregular surface.

The polar material may be formed in an endless belt, capable of going round the upper surface of the reaction liquid material. In this case, the polar material is preferably selected from materials having a pertinent rigidity and flexibility; for example, a laminated sheet of formaldehydetreated polyvinyl alcohol fabric, a polyvinyl chloride sheet containing rubber of plasticizing agent or internally plasticized by copolymerized component, a polyurethane sheet with or without an additional agent, or a laminated sheet composed of two or more of the above-stated sheets or reinforced by the formaldehyde-treated polyvinyl alcohol fabric or metallic net.

Figure 11:
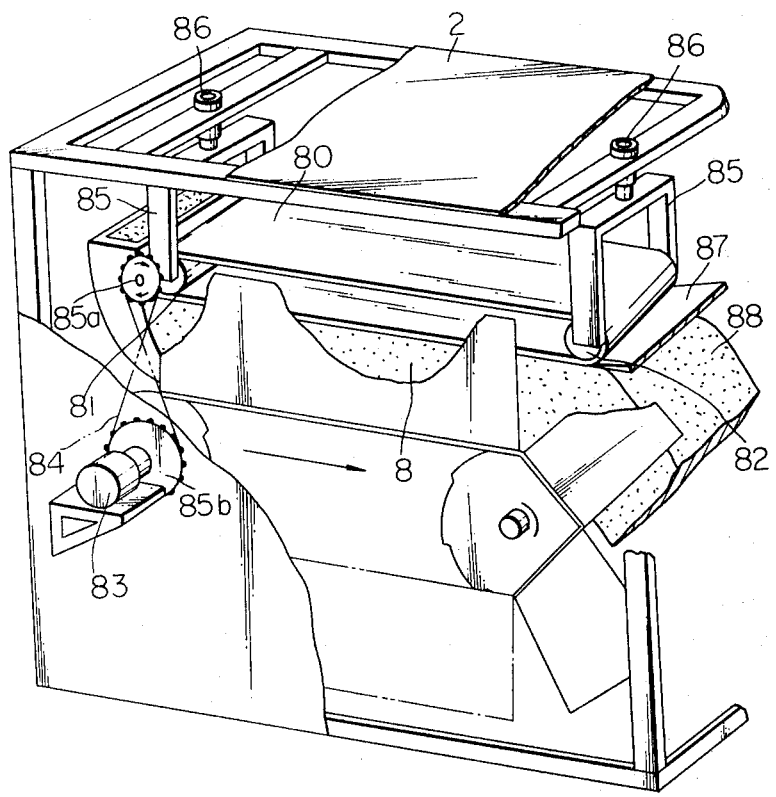
FIG. 11 is a schematic view of another embodiment of the apparatus of the present invention with an endless polar belt.

Referring to FIG. 11, an endless belt 80 consisting of the polar material, is arranged above the reaction trough 8 so that the lower surface of the belt 80, close to the reaction trough 8, is brought into contact with the upper surface of the reaction liquid material in the reaction trough 8. The belt 80 is supported by a pair of supporting rollers 81 and 82, arranged parallel to each other and supported by arms 85 secured by the frame of housing 2. The roller 81 is connected to a motor 83 through a driving chain 84 and gears 85a and 85b. When the motor 83 is actuated, the belt is circulated around the supporting rollers 81 and 82. The assembly of the belt 80, rollers 81 and 82 and arms 85 can be moved up and down by rotating a pair of bolts 86. A blade member 87 is disposed under the roller 82 to separate the solidified polyvinyl acetal porous sheet 88 from the belt 80.

Figure 12:
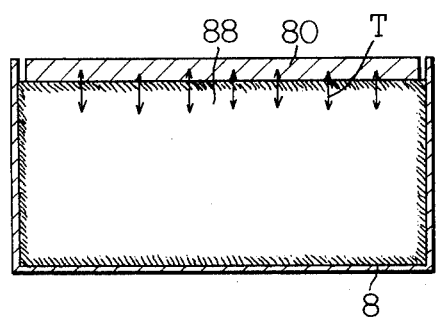
FIGS. 12 and 13 are schematic views for clarifying the effect of the polar belt in FIG. 11.

Referring to FIG. 12, the upper surface of the reaction liquid material is adhered to the lower surface of the polar belt 80, and this adhesion is maintained during the reaction and even after residual liquid escapes from the solidified porous sheet, due to the high affinity T between the liquid material and the polar sheet. Accordingly, the liquid material can complete solidification such that the upper surface of the solidified porous sheet 88 is adhered to the lower surface of the belt 80, without shrinkage in volume.

Figure 13:
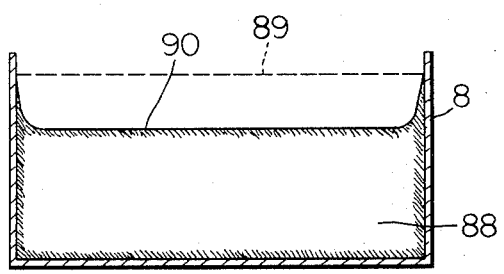

Referring to FIG. 13, in the case the polar belt is not used, the reaction liquid material having an upper surface at level 89 is converted to the porous sheet 88 having an upper surface at level 90 below the level 89. That is, there is considerable shrinkage in volume during the solidification.

The shrinkage in volume, as stated above, can be avoided by showering water or an aqueous solution of aldehyde and acid onto the solidified porous sheet at the exit portion of the reaction trough. This liquid to be showered may be selected from liquids having affinity to the polyvinyl acetal, for example, alcohol, or preferably, water and an aqueous solution of aldehyde and acid. The aqueous solution may be optionally adjusted to the respective concentrations of acid and aldehyde. Usually, it is preferable that the concentration of the showering solution is higher than that of the reaction liquid material. Further, the showering water or aqueous solution is preferably of a temperature the same as or higher than the reaction temperature, that is, 40° to 100°C, to obtain excellent penetration into the solidified porous sheet and a high degree of prevention with regard to volume shrinkage. Further, it is preferable to add a surface active agent into the showering water of aqueous solution to enhance penetrability.

Additionally, hot water containing a water-soluble plasticizing agent, such as polyethylene glycol and monoor di-ethers thereof, may be applied onto the solidified porous sheets before showering. This effectively enhances the resiliency of the porous sheet.

The solidified polyvinyl acetal porous sheet may be immersed into an aqueous bath containing an aldehyde and an acid at a temperature of 40° to 90°C, from 30 minutes to 40 hours. This immersion is effective for completing the polyvinyl acetal forming reaction, enhancing the resiliency of the resultant porous sheet, recovering from volume shrinkage, and setting the resultant porous sheet at the recovered condition.

The immersing solution may be the same in composition as the showering aqueous solution as stated hereinbefore. The temperature of the immersing solution is preferably higher by about 10°C or more, than the reaction temperature.

The polyvinyl acetal porous sheet solidified and aftertreated as mentioned above, is subjected to a washing process. In washing, the residual liquid in the pores formed in the porous sheet is removed and the porous sheet is allowed to cool rapidly.

This is effective for stopping the reaction and producing a uniform porous sheet.

In the conventional washing method, the porous sheet is alternately compressed and released in water. This process utilizes the highly elastic property of the polyvinyl acetal porous sheet in wet condition, although it is effective only for a porous sheet of 30 mm or less thickness. In the events the porous sheet has a thickness of 50 mm or more, particularly, 70 mm or more, and a plurality of thin porous sheets are superimposed to a total thickness of 50 mm or more, there is the disadvantage that a very long time is required to complete the washing. The usual polyvinyl acetal porous sheet has a porosity of about 75 percent or more, preferably, 75 to 93 percent, more preferably, 87 to 91 percent. Therefore, it is theoretically possible to compress the porous sheet to a thickness of one fifth the original. However, practically speaking, the porous sheet right after the reaction can be compressed only to one half the original thickness. If the porous sheet is compressed at a compression ratio more than 1 : 2, it results in a permanent deformation of the porous sheet and thus, in an undesirable change in quality such as porosity and pore size. This deformation is derived from the low streangth and high plasticity of the framework of the porous sheet at the high production temperature.

For example, a polyvinyl acetal porous sheet having a thickness of 150 mm and a temperature of 65°C was immersed in a water bath through which a large amount of water was circulated at a temperature of 20°C; it was then alternately compressed to one half the original thickness and released, at time intervals of 5 minutes. During the washing, the temperature and pH were determined in an inner portion of the porous sheet. It was observed that the temperature and pH were, respectively, 65°C and lower than 2.0 after 10 minutes, 40°C and 3.6 after 50 minutes, 29°C, and 5.1 after 80 minutes and 27°C and 5.7 after 120 minutes. As is clear in the above statement, the conventional washing method wherein the porous sheet is alternately compressed and released in water, requires a very long time to cool to room temperature and to elevate the pH to 6.5 to 7.0. Such a prolonged washing time results in a non-uniform quality of the resultant porous sheet. The above-stated disadvantages can be eliminated by the washing methods stated hereinafter.

Figure 14:
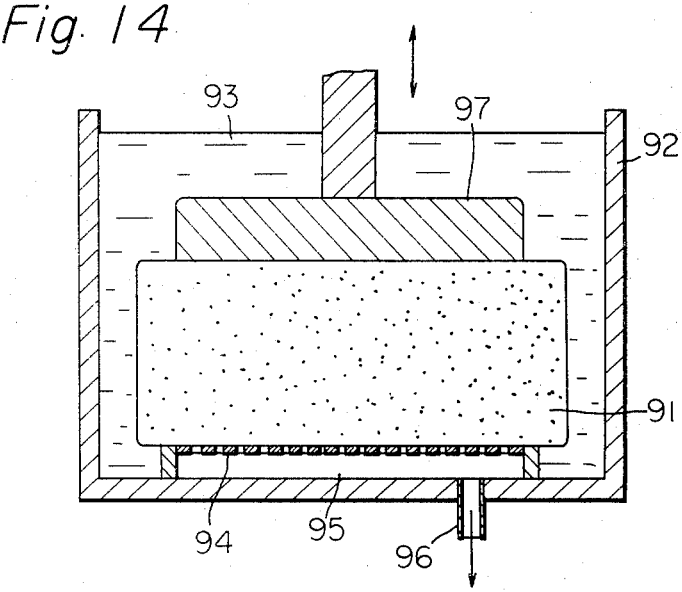
FIG. 14 is a cross-sectional view of an embodiment of a washing device for the porous material.

Referring to FIG. 14, a polyvinyl acetal porous sheet 91 containing the residual solution in its pores, is immersed into a washing bath 92 containing water 93. The lower surface of the porous sheet is brought into contact with a punched plate or net 94 of a suction chamber 95 connected to a suction pump (not shown in the drawing) through a conduit 96. A compressing plate 97 presses the upper surface of the porous sheet 91 under a pressure of 50 g to 1000 g/cm². Accordingly, the residual solution is sucked away by the suction pump through apertures of the punched plate 94, suction chamber 95 and the conduit 96. When the suction is stopped and the compressing plate 97 is removed, the compressed porous sheet recovers in volume while sucking water into the pores. By repeating the above-mentioned operations, the porous sheet is rapidly washed and allowed to cool.

Figure 15:
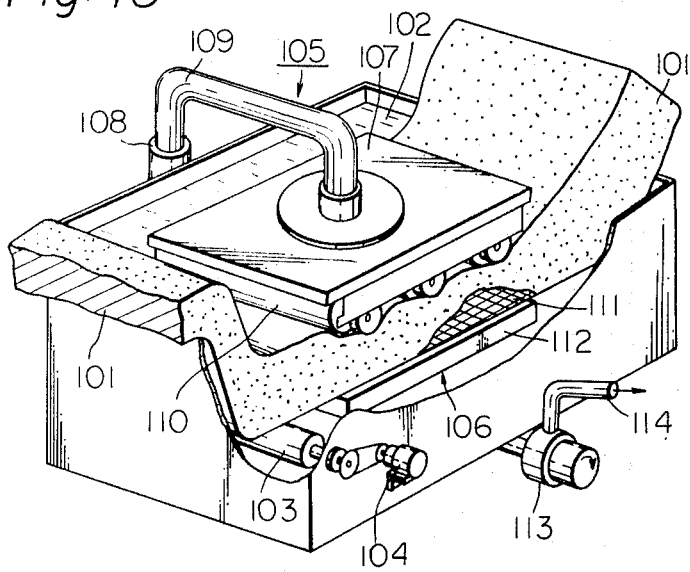
FIG. 15 is a schematic view of another embodiment of the washing device.

The porous sheet may be continuously washed using a washing apparatus as shown in FIG. 15. Referring to FIG. 15, a continuous porous sheet 101 is introduced into a washing bath 102 containing water, and is advanced through the bath by rotating a conveyer roller 103 disposed at the bottom portion of the bath and connected to a motor 104. The upper surface of the advancing porous sheet is pressed by a compressing device 105, and simultaneously, the lower surface is sucked by a suction device 106. The compressing device 105 comprises a presser plate 107 connected to an oil pressurizing device 108 through an arm 109 and a plurality of rotatable compressing rollers 110 disposed on the lower surface of the presser plate 107. The oil pressurizing device 108 can move the presser plate 107 and the compressing rollers 110 up and down.

The suction device 106 comprises a punched plate or net 111 and a suction box 112 supporting the punched plate 111 and is connected to a suction pump 113.

When the oil pressurizing device 108, the motor 104 and the suction pump 113 are actuated, the porous sheet 101, advancing by the action of the conveyor roller 103 through the washing bath 102, is continuously compressed by the compressing rollers 110, and simultaneously, the liquid in the porous sheet 101 is sucked by the suction pump 113 through the punched plate 111 and the suction box 112. The sucked liquid is discharged through a conduit 114 out of the apparatus or recycled into the washing bath 102.

The compression and suction for the porous sheet may be periodically effected while advancing the porous sheet or while the porous sheet is stationary. In the latter case, the presser plate 107 may have no rollers, that is, it may have a flat lower face.

Figure 16:
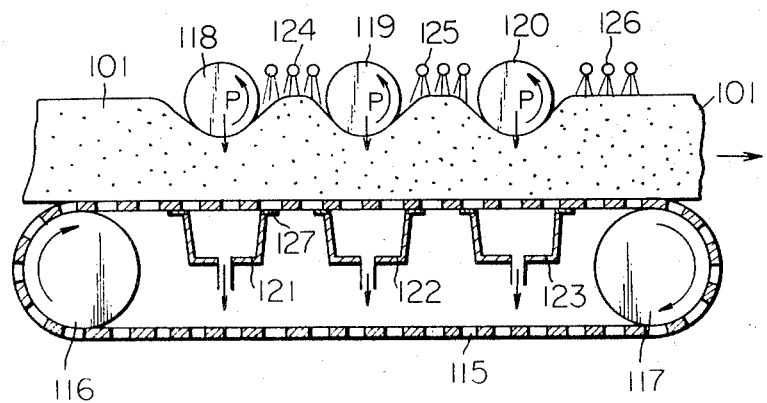
FIG. 16 is a schematic view of a third embodiment of the washing device.

Referring to FIG. 16, the porous sheet 101 is carried by an endless conveyer 115 circulating around a pair of guide rollers 116 and 117. The conveyer 115 is composed of a net sheet having numerous apertures to allow liquid to flow therethrough. Rotatable compressing rollers 118, 119, 120 are disposed above the conveyer 115 to compress the porous sheet 101 on the conveyer 115. Three suction chambers 121, 122, 123 are located under a portion of the conveyer 115 carrying the porous sheet 101 in positions facing the compressing rollers 118, 119, 120, respectively, to suck liquid in the porous sheet through the apertures of the conveyer 115. The suction boxes 121, 122, 123 are each connected to a suction pump (not shown in the drawing). The suction boxes 121, 122, 123 are each provided with a contacting member 127 made of, for example, a rubber plate which comes into slidable contact with the conveyer sheet 115. Three showering devices 124, 125, 126 are located respectively downstream of the compressing rollers 118, 119, 120.

The porous sheet 101 is conveyed by the conveyer 115, successively compressed by the compressing rollers 118, 119, 120 and washed with water showered through the showering devices 124, 125, 126. The liquid contained in the porous sheet 101 is successively squeezed out by the compressing rollers 118, 119, 120 and simultaneously sucked away by the suction pump (not shown) through the apertures of the conveyer 115 and suction boxes 121, 122, 123. The liquid remaining in the porous sheet is diluted by the showered water.

Additionally, an endless belt (not shown in the drawing) may be disposed around the rollers 118, 119, 120. In this case, the porous sheet can be squeezed between the endless belt and the conveyer 115. A porous sheet made of a plurality of superimposed sheets, may also be washed in this manner.

Figure 17:
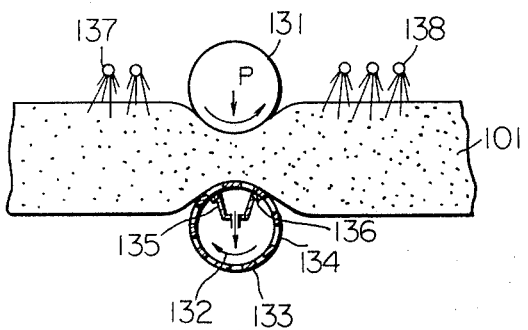
FIG. 17 is a schematic view of a fourth embodiment of the washing device.

Referring to FIG. 17, the porous sheet 101 is squeezed between a pair of rotatable rollers 131 and 132. The upper roller 131 has a smooth peripheral surface for compressing the porous sheet. The lower roller 132 is provided with a periphery 133, having a number of apertures 134, and contains therewithin a suction box 135 connected to a suction pump (not shown in the drawing). The suction box 135 has a contacting member 136 which comes into slidable contact with the inside surface of the periphery 133. The porous sheet is saturated by the water showered through a shower 137 disposed upstream of the roller 131, and then the liquid in the porous sheet is squeezed by the rollers 131 and 132, and simultaneously sucked by the suction pump (not shown) through the aperture 134 and the suction box 135. The sucked porous sheet is saturated by water showered through a shower 138 disposed downstream of the roller 131. Two or more washing devices, as shown in FIG. 17, may be arranged in series.

The compressing plate may have a mechanism for spouting washing water on the porous sheet. When the porous sheet is compressed, the washing water flows through the compressed porous sheet to push out the residual liquid therewithin. When the compression is released, and thus the porous sheet recovers its thickness, the spouted water is absorbed into the pores to dilute the residual liquid. By alternately repeating this compressing and releasing, the porous sheet is cleaned and cooled uniformly.

Figure 18:
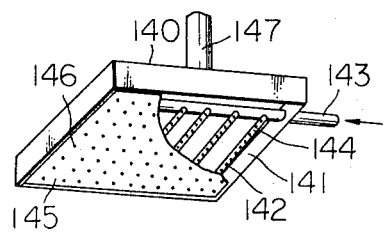
FIG. 18 is a schematic view of an embodiment of a compressing plate for washing the porous material.

Referring to FIG. 18, a compressing plate 140 is provided with a cavity 141 formed on its lower face. The cavity 141 contains a plurality of pipes 142 connected to a main pipe 143 for water supply. The pipes 142 have a multitude of apertures 144 for spouting water downwardly. The cavity 141 is covered by a bottom plate 145 having a multitude of apertures 146 through which water flows uniformly downward. The compressing plate 140 is connected, by an arm 147, to a means for moving it up and down (not shown in the drawing).

Figure 19:
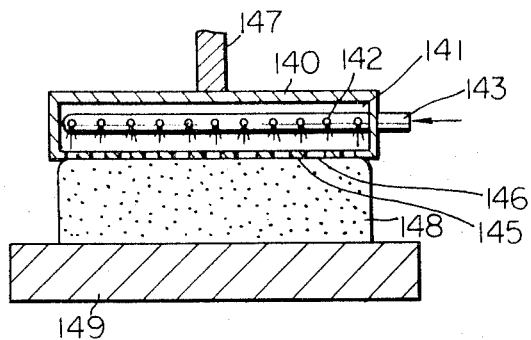
FIG. 19 is a cross-sectional view of a fifth embodiment of the washing device.

Referring to FIG. 19, a polyvinyl acetal porous sheet 148 is compressed between the compressing plate 140 and ground plate 149 by moving the compressing plate 140 downwards to remove the residual liquid within the porous sheet 148. Thereafter, the compressing plate 140 is moved up and washing water is showered through the apertures 146 of the bottom plate 145. The porous sheet recovers its volume due to its elasticity and the showered water is absorbed into the pores of the porous sheet, communicating with each other, to dilute the residual liquid. Next, the porous sheet is compressed by moving the compressing plate 140 downward to remove the diluted residual liquid. The water supply may be effected in only the non-compressing step or in both the compressing and the non-compressing steps. It is preferable to supply water at an early stage of the compressing step. The compressing plate may be moved by means of oil pressure, hydraulic pressure or air pressure, or by a conventional mechanical device. The pressure applied to the porous sheet is adjusted, considering the porosity thereof. Generally, the larger the porosity, the smaller the pressure. Usually, the pressure is in the range of from 50 g/cm$^2$ to 1000 g/cm$^2$. The water spouting pipe contained in the cavity 141 may be a circinate pipe having numerous apertures for spouting water therethrough and connected to the main pipe. The bottom plate of the cavity may be made of a metallic net, non-woven fabric of metallic threads or a synthetic resin net, preferably having reinforcements to prevent breakage during compression of the porous sheet.

Figure 20:
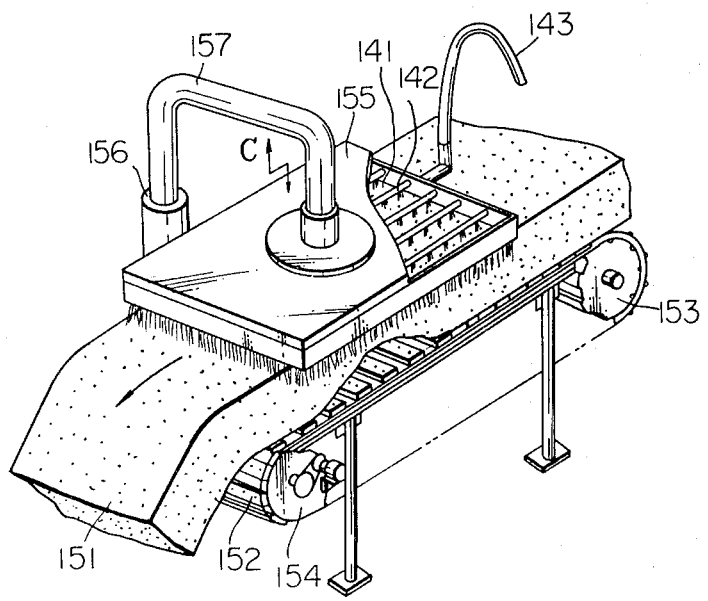
FIG. 20 is a schematic view of a sixth embodiment of the washing device.

The washing process as shown in FIGS. 18 and 19 may be carried out continuously. Referring to FIG. 20, the length of the porous sheet 151 is intermittently carried by a conveyer 152 circulating around a pair of wheels 153 and 154. A compressing plate 155 is disposed above the conveyer 152 in a position such that the plate 155 can push the porous sheet 151 onto the conveyer 152. The compressing plate 155 is provided with means for uniformly flowing water downwardly through numerous apertures formed in the bottom plate. Also, the compressing plate 155 is connected to means for applying oil pressure 156 through a support arm 157. When the conveyer 152 has carried the porous sheet 151 to a predetermined position, the conveyer 152 stops and the compressing plate 155 moves down to compress the porous sheet and, if necessary, water is forcibly flowed through the porous sheet. After the predetermined compressing time, the compressing plate 155 moves up to release the compression, water flows toward the porous sheet 151, and then the porous sheet 151 is carried, by the conveyer 152, a distance not longer than the length of the compressing plate 155.

The conveyer 152 may be a metallic conveyer net, metallic plate belt or rubber belt having a number of apertures through which the removed liquid flows. Also, a plurality of the compressing plates may be arranged above one conveyer. Otherwise, the compressing plate may advance at the same velocity as that of the conveyer while compressing the porous sheet and then return back to the original position while releasing the compression and showering water onto the porous sheet. The suction device as shown in FIG. 15 may be disposed on the lower side of the conveyer carrying the porous sheet.

The features and advantages of the present invention will become apparent by reading the following Examples which are not intended to limit the scope of the present invention.

EXAMPLE 1

A mixture of 5.0 kg of polyvinyl alcohol, having a degree of polymerization of 1400 and a percentage of saponification of 99 and 3.6 kg of starch in 60.0 litres, was heated at its boiling point while stirring to dissolve the polyvinyl alcohol and gelatinize the starch. To the resultant solution was added 6.3 litres of concentrated sulfuric acid (98 percent) and 7.6 litres of aqueous solution of 38 percent by weight of formaldehyde. Then this mixture was diluted to 100 litres of reaction liquid material by adding water, and allowed to cool to a temperature of 37°C.

The reaction liquid material was supplied to the reaction apparatus as shown in FIGS. 1 through 6. The reaction apparatus was contained in a closed housing and maintained at a temperature of 70°C by hot air flow, using a heater of 5KW and a blower of a maximum flow rate of 24 m$^3$/min. The reaction trough had a width of 200 mm and a length of 6 m and was provided with five pairs of brushes capable of coming into slidable contact with the electrodes of the unit members forming the reaction trough. A voltage of 11 volts was applied to two pairs of the brushes located at the outer most positions. A voltage of 16 volts was applied to a pair of brushes located at the center position. Also, a voltage of 14 volts was applied to two pairs of the brushes located at intermediate positions between the outside and center positions.

The conveyer was circulated at a velocity of 10 cm/min and the reaction liquid material was fed onto the reaction trough while applying the voltages to the electrodes of the unit members forming the reaction trough. The reaction liquid material was raised to a temperature of about 69°C at the rate as shown in FIG. 8, curves A and B.

During a period of 6 hours, the polyvinyl alcohol in the reaction liquid material was converted to polyvinyl acetal, and thus a polyvinyl acetal porous sheet 200 mm wide and 30 mm thick, was obtained.

EXAMPLE 2

The same procedure as that of Example 1 was repeated using the apparatus as shown in FIGS. 1 through 5, and 7, except that the conveyer was circulated at a velocity of 8 cm/min. The reaction trough was provided with ten pairs of brushes and a voltage of 12 volts was applied to all the brushes. The reaction liquid material was raised to a temperature of about 69°C in about 1 hour. Even after the unit members carrying the reaction liquid material became free from the voltage-applied brushes, the reaction liquid material was maintained at about 69°C until the unit member was separated from the resultant polyvinyl acetal porous sheet. After 7.5 hours, the porous sheet was obtained. The resultant porous sheet had a uniform quality in porosity, pore size, width and thickness.

EXAMPLE 3

A reaction liquid material was prepared by the following procedures. 7 parts by weight of polyvinyl alcohol, having polymerization degree of 1700 and a saponification percentage of 99, was dispersed in water and then heated to dissolve it. The solution was allowed to cool to a temperature of approximately 50°C. An aqueous dispersion of 4 parts by weight of wheat starch was added to the polyvinyl alcohol solution. The mixture was heated at a temperature of 75° to 80°C while stirring, to gelatinize the wheat starch, and allowed to cool to a temperature of 35°C. The cooled solution was mixed with 9 parts by weight of an aqueous of solution containing 37 percent by weight of formaldehyde, and 13 parts by weight of an aqueous solution containing 50 percent by weight of sulfuric acid. This mixture was then diluted to 100 parts by weight of the reaction liquid material by adding the necessary amount of water.

The reaction liquid material was raised from a temperature of 35°C to a temperature of 70°C within about 21 seconds using a preheating device as shown in FIG. 9. The preheating device had an outside diameter of 80 mm and a length of 400 mm, and was provided with a cylindrical passage of 30 mm inner diameter for the reaction liquid material. The cylindrical passage was surrounded by four pairs of arc-shaped electrodes facing each other and insulating material pieces located between the electrodes. In preheating, an A.C. voltage of 30 volts was applied to the electrodes, and the reaction liquid material flowed at a flow rate of 300 cc/min. The applied voltage generated an electric current of 15 amperes flowing through the reaction liquid material. The 35°C temperature of the reaction liquid material was rapidly raised to 70°C within 21 seconds. However, there was no increase in viscosity and no gelatinization of the reaction liquid material.

The preheated reaction liquid material was fed onto a reaction trough in the apparatus as shown in FIGS. 1 through 6, at a flow rate of 300 cc/min. The reaction apparatus was contained in a housing maintained at a temperature of 70°C by hot air flow generated by a heater of 10 KW and a blower of a maximum capacity of 30 m³/min. The conveyer was circulated at a velocity of 1 cm/min. It took approximately 5.5 hours to complete the reaction. The result was a continuous uniform polyvinyl acetal porous sheet having a width of approximately 20 cm and a thickness of approximately 14 cm. The porosity and pore size of the resulting porous sheet were determined at an inner portion 3 cm from a side surface another inner portion 3 cm from an upper surface and a center portion of the porous sheet. Results are illustrated in Table 1.

The pore size was determined microscopically at a relatively low magnification. The porosity was determined by measuring the volume and weight of the sampled portions of the porous sheet. For comparison, the same reaction liquid material as that used in the present example was fed into a container of 20 cm length, 50 cm width and 17 cm depth, and the container was kept in a hot chamber maintained at a temperature of 70°C for 10 hours. During these 10 hours, the reaction liquid material was converted to a polyvinyl acetal porous block having a percentage of acetal formation similar to that of the present example. The porosity and pore size of the comparative porous block are shown in Table 1.

Table 1

| Item Example | Reaction Time (hour) | Pore Size ($\mu$) | | | Porosity (%) | | |
|---|---|---|---|---|---|---|---|
| | | Side portion | Upper surface portion | Center portion | Side portion | Upper surface portion | Center portion |
| The Present Example | 5.5 | 90–120 | 90–110 | 90–120 | 90.5 | 90.2 | 90.8 |
| Comparison Example | 10 | 60–100 | 60–90 | 80–120 | 89.1 | 88.7 | 91.4 |

Table 1 shows that the process of the present invention is more efficient in production and produces a polyvinyl acetal porous article more uniform quality, pore size and porisity, than that of the comparative process.

EXAMPLE 4

A solution containing 5 parts by weight of polyvinyl alcohol, having a degree of polymerization of 1,100 and a percentage of saponification of 88, and 4 parts by weight of wheat starch in 66 parts by weight of water, was prepared by the following procedure. The polyvinyl alcohol was dispersed in water and then the dispersion was heated at a temperature of 95° to 98°C, to dissolve the polyvinyl alcohol, and allowed to cool to a temperature of 60°C. The solution was mixed with a dispersion of the wheat starch in water. Then, the mixture was heated at a temperature of 70° to 75°C to gelatinize the wheat starch, and allowed to cool to a temperature of 50°C. The resultant solution was mixed with 15 parts by weight of an aqueous solution of 50 percent by weight of sulfuric acid and 10 parts by weight of an aqueous solution of 37 percent by weight of formaldehyde. The resultant reaction liquid material was of a temperature of 36°C. The inventors had observed in previous experiences that if the temperature is higher than 40°C, the acetal formation reaction begins in the reaction liquid material. The reaction liquid material was fed to a preheating device as shown in FIGS. 10A and 10B at a flow rate of 1,000 cc/min using a quantitative pump. The preheating device for the reaction liquid material had a cylindrical passage with an inside diameter of 35 mm, a length of 200 mm, an effective volume of 143 cc, and a stirrer having four paddles, connected to a motor. The stirrer was rotated at a rotation velocity of 50 r.p.m. The cylindrical passage was surrounded by a pair of carbon electrodes insulated by a pair of insulating members located between the electrodes. When an A.C. voltage of 25 volts was applied to the electrodes, an electric current of 51 amperes flowed through the reaction liquid material to generate Joule heat therein. The 36°C temperature of the reaction liquid material was raised to a temperature of 66°C within less than 9 seconds, while the reaction liquid material passed through the cylindrical passage. That is, the rate temperature rise was 3.5°C/sec. The reaction liquid material thus preheated was subjected to the same acetal forming reaction as that of Example 3, and the same results were obtained.

EXAMPLE 5

36 kg of polyvinyl alcohol, having a polymerization degree of 1400 and a saponification percentage of 99, was dispersed in water to prepare an aqueous dispersion of 300 litres. The aqueous dispersion was heated to the boiling point to dissolve the polyvinyl alcohol. An aqueous dispersion was prepared from 18 kg of maize starch, having an average particle size of 50 $\mu$, and 30 litres of water. The aqueous dispersion was mixed into the polyvinyl alcohol solution and then the mixture was heated to a temperature of 80°C while stirring to gelatinize the starch. The solution was adjusted to 360 litres by adding water. The solution was mixed with 60 litres of an aqueous solution of 37% by weight of formaldehyde and 60 litres of an aqueous solution of 98 percent by weight of sulfuric acid to prepare a reaction liquid material.

A reaction apparatus as shown in FIG. 11 was used to produce the polyvinyl acetal porous sheet from the reaction liquid material prepared above. In the apparatus, a polar endless belt having a thickness of 5 mm, was disposed above the reaction trough. The polar belt was composed of a polar layer consisting of an internally plasticized polyvinyl chloride and a substrate layer consisting of a formaldehydetreated polyvinyl alcohol fabric. The reaction apparatus was contained in a housing maintained at a temperature of 65°C by flowing therethrough hot air generated by a heater of 15 KW and a blower with a maximum capacity of 50 m³/min. The conveyer carrying the unit members forming the reaction trough was circulated at a velocity of 1 cm/min. The reaction liquid material was fed onto the reaction trough at a depth of 20 cm. The polar belt was circulated at the same velocity as that of the conveyer while coming into contact with the upper surface of the reaction liquid material in the reaction trough. After 8 hours, the reaction liquid material was completely converted to a polyvinyl acetal porous sheet having a thickness of 20 cm. The resultant porous sheet was subjected to measurements of porosity and pore size at portions 0.5 cm, 1 cm and 5 cm from the upper surface, a center portion and portions 0.5 cm and 1 cm from the bottom surface of the porous sheet.

For comparison, the same procedure as that of the present example was repeated without the polar belt, and the resulting comparative porous sheet was subjected to the sme measurements as stated above. The results are shown in Table 2.

Table 2

| Example | Polar belt | Thickness of sheet at a center portion (cm) | Quality | Uppersurface portion Distance from upper surface (cm) | | | Center portion | Bottom surface portion Distance from upper surface (cm) | |
|---|---|---|---|---|---|---|---|---|---|
| | | | | 0.5 | 1 | 5 | | 1 | 0.5 |
| The present Example | Used | 19.5 | Porosity (%) | 89.8 | 90.3 | 90.1 | 90.3 | 90.1 | 89.7 |
| | | | Pore Size ($\mu$) | 55–78 | 60–76 | 60–80 | 62–80 | 60–74 | 58–80 |
| Comparison Example | Not used | 12.2 | Porosity (%) | 82.1 | 82.6 | 83.8 | 87.4 | 85.5 | 85.1 |
| | | | Pore Size ($\mu$) | 40–60 | 44–61 | 50–68 | 65–85 | 52–70 | 52–65 |

Table 2 shows that the porous sheet of the present example has a higher quality in porosity and pore size than that of the comparative example.

Further, the same procedure as that of the present example was repeated using a polar belt having a polar layer consisting of a formaldehyde-treated polyvinyl alcohol fiber canvas. The resultant polyvinyl acetal porous sheet had the same quality as that of the present example.

EXAMPLE 6

A reaction liquid material contining 6 percent by weight of polyvinyl alcohol, 5 percent by weight of wheat starch, 6 percent by weight of an aqueous solution of 37 percent by weight of formaldehyde and 12 percent by weight of an aqueous solution of 50 percent by weight of sulfuric acid, was prepared by the following procedure. The polyvinyl alcohol, having a polymerization degree of 1100 and a saponification percentage of 88, and another polyvinyl alcohol, having a polymerization degree of 1400 and a saponification percentage of 99, were admixed in a proportion of 1:1, and the mixture was dispersed in water. The dispersion was heated to dissolve the polyvinyl alcohols and then allowed to cool to a temperature of about 50°C. The cooled solution was mixed with an aqueous dispersion of the wheat starch which was previously sieved to an average particle size of 60 $\mu$. The mixture was then heated at a temperature of 75° to 80°C while stirring to gelatinize the wheat starch and allowed to cool to a temperature of 35°C. The cooled solution was mixed with the formaldehyde solution and the sulfuric acid solution to prepare the reaction liquid material.

The reaction liquid material was converted to a polyvinyl acetal porous sheet using a reaction apparatus as shown in FIG. 1. The reaction apparatus was contained in a housing maintained at a temperature of 75°C by flowing hot air through a heater of 15 KW using a blower of a maximum capacity of 50 m³/min. The conveyer was circulated at a velocity of 1 cm/min. The reaction liquid material was fed onto the reaction trough at a depth of 20 cm and heated at 75°C for 7 hours. After completing the reaction, the resultant porous sheet was treated, at an exit portion of the reaction trough, with an aqueous solution at 80°C, containing 8 percent by weight of an aqueous solution of 37 percent by weight of formaldehyde and 15 percent by weight of an aqueous solution of 50 percent by weight of sulfuric acid. The treating solution was showered onto the upper surface of the porous sheet to form a uniform layer 3 to 5 mm thick, on the upper surface. The treated porous sheet was kept without washing for 1 hour, and then washed with water and dried. The resultant porous sheet was subjected to measurement of porosity and pore size at portions 0.5 cm, 1 cm and 5 cm from the upper surface, a center portion and portions 0.5 cm and 1 cm from the bottom surface of the porous sheet.

For comparison, the same procedure stated above was repeated without the showering of the treating solution. The resulting comparative porous sheet was subjected to the same measurements as those as stated above. The results are shown in Table 3.

| Center portion | Bottom surface portion Distance from the bottom surface (cm) | |
| --- | --- | --- |
|  | 1.0 | 0.5 |
| 91.0 | 90.8 | 90.7 |
| 82–98 | 78–100 | 80–94 |
| 88.1 | 86.4 | 86.8 |
| 78–90 | 72–85 | 72–90 |

Table 3 clearly shows that the porous sheet of the present example is more uniform in quality, porosity and pore size, than that of the comparison example.

EXAMPLES 7 to 11

A dispersion of 40 kg of polyvinyl alcohol, having a polymerization degree of 1700 and a saponification percentage of 99 and 25 kg of wheat starch in water was heated to a temperature of 80°C to dissolve the polyvinyl alcohol and to gelatinize the starch and then diluted to 460 litres by adding water. The solution was mixed with 80 litres of an aqueous solution of 37 percent by weight of formaldehyde and 80 litres of an aqueous solution of 98 percent by weight of sulfuric acid to prepare a reaction liquid material.

THe reaction liquid material was supplied to The reaction apparatus as shown in FIG. 1 to prepare five kinds of porous sheets (Examples 7 to 11). The supplied reaction liquid material formed a layer 20 cm thick on the reaction trough. The conveyer was varied in circulating velocity from 0.8 cm/min to 10 cm/min to vary the heating time for the reaction liquid material on the reaction trough in the range from 0.7 hours to 7 hours as shown in Table 4. An A.C. voltage of 15 volts was applied to the electrodes. At 15 volts, an electric current of 7.0 amperes flowed through the reaction liquid material and the temperature of the reaction liquid material was raised to 67° to 73°C. After the resultant porous sheet was separated from the reaction trough, it was immersed in an aftertreating bath containing an aqueous solution of 15 percent by weight of 37 percent formaldehyde aqueous solution and 15 percent by weight of 50 percent sulfuric acid aqueous solution at a temperature of 70°C, and retained in the bath for a period of from 0.7 to 7.0 minutes as shown in Table 4.

The resulting five kinds of polyvinyl acetal porous sheets were subjected to the same measurement of porosity and pore size as those of Example 6.

For comparison, the same procedure as that of the

Table 3

| Example | Thickness of center portion (cm) | Quality | Upper surface portion Distance from the upper surface (cm) | | |
| --- | --- | --- | --- | --- | --- |
|  |  |  | 0.5 | 1 | 5 |
| The Present Example | 19.1 | Porosity (%) | 90.3 | 90.8 | 91.2 |
|  |  | Pore Size ($\mu$) | 75–98 | 80–96 | 80–100 |
| Comparison Example | 14.7 | Porosity (%) | 83.6 | 83.8 | 85.5 |
|  |  | Pore Size ($\mu$) | 60–80 | 64–81 | 70–88 | present examples was repeated except that the reaction liquid material was heated at 67° to 73°C for 8 hours and the after-treatment was omitted. The comparative porous sheet was subjected to the same measurements as those of Example 6. The results are shown in Table 4.

Table 4

| Example | Heating time (h) | After-treating time (min) | Thickness of center portion (cm) | Quality | Upper surface portion Distance from upper surface (cm) | | Center portion | Bottom surface portion Distance from bottom surface (cm) | |
|---|---|---|---|---|---|---|---|---|---|
| | | | | | 0.5 | 1 | | 1 | 0.5 |
| 7 | 0.7 | 7 | 17.1 | Porosity | 88.4 | 88.8 | 89.4 | 89.1 | 89.2 |
| | | | | Pore Size | 66–89 | 68–90 | 72–89 | 67–86 | 69–87 |
| 8 | 1 | 6 | 19.4 | Porosity | 90.3 | 90.8 | 91.0 | 90.7 | 90.8 |
| | | | | Pore Size | 75–98 | 80–96 | 82–98 | 80–94 | 78–100 |
| 9 | 3 | 4 | 19.3 | Porosity | 90.4 | 90.7 | 91.2 | 90.8 | 90.6 |
| | | | | Pore Size | 76–99 | 81–95 | 82–100 | 80–96 | 80–97 |
| 10 | 6 | 1 | 18.6 | Porosity | 89.7 | 90.1 | 90.9 | 90.8 | 90.7 |
| | | | | Pore Size | 72–88 | 76–93 | 78–98 | 75–91 | 74–92 |
| 11 | 7 | 0.7 | 16.9 | Porosity | 88.2 | 88.6 | 89.2 | 89.5 | 89.3 |
| | | | | Pore Size | 69–86 | 71–88 | 74–95 | 70–80 | 70–84 |
| Comparison Example | 8 | — | 13.2 | Porosity | 82.6 | 82.8 | 87.1 | 85.8 | 85.4 |
| | | | | Pore Size | 58–75 | 62–77 | 68–85 | 65–83 | 63–85 |

Table 4 shows that each of the porous sheets of Examples 7 to 11 were more uniform in porosity and pore size than that of the Comparison Example. Further, it is shown in Table 4 that the porous sheet of Example 8, which was heated for the relatively short time of 1 hour and aftertreated for the relatively long time of 6 hours, had a highly uniform quality. From this fact, the advantage of the aftertreatment is obvious.

EXAMPLE 12

The same procedure as that of Example 1 was repeated except that the reaction liquid material contained 9 percent by weight of polyvinyl alcohol, having a polymerization degree of 1400 and a saponification percentage of 99, 6 percent by weight of potato starch, 8 percent by weight of 37 percent formaldehyde aqueous solution and 10 percent by weight of 50 percent sulfuric acid aqueous solution, and the reaction was effected at a temperature of 60°C for 8 hours. In addition, the reaction liquid material was fed onto the reaction trough at a thickness of approximately 24.0 cm.

The resultant polyvinyl acetal porous sheet had a porosity of approximately 90 percent, an average pore size of approximately 120μ, acetal formation of about 70 percent and a thickness of about 240 mm. The porous sheet was washed using a washing device as shown in FIG. 15. In the washing, the porous sheet was compressed to one half the original volume under a pressure of 200 to 350 g/cm² and sucked under a reduced pressure of 200 mmHg in a water bath at a temperature of 20°C. The compression and suction were repeated at intervals of 5 minutes. The water bath was kept in clean condition by supplying fresh water of 20°C thereinto and discharging the sucked water. The variation of the porous sheet in temperature and pH with lapse of time of washing was measured by inserting a thermometer and a pH meter into a center portion of the porous sheet.

Figure 21:
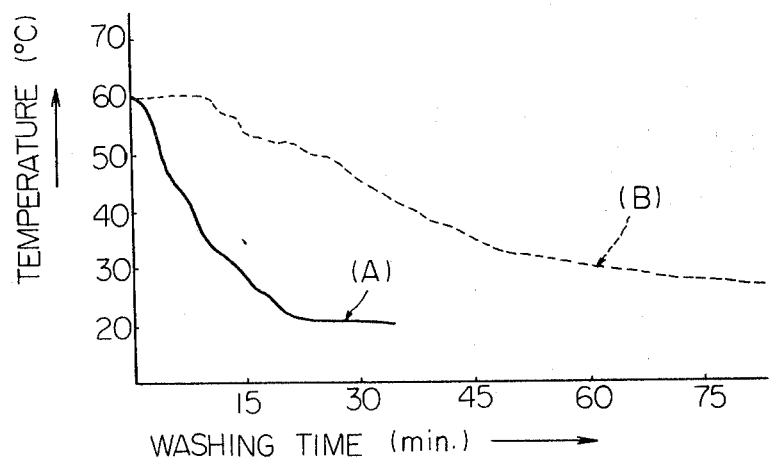
FIG. 21 is a graph showing the relationship between washing time and temperature of the porous material.
Figure 22:
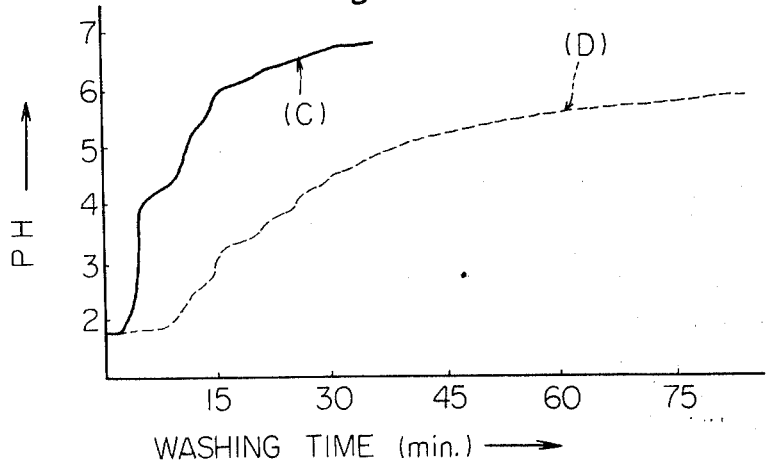
FIG. 22 is a graph showing the relationship between washing time and pH of the porous material.

For comparison, the solidified porous sheet was washed without the suction. The same measurements as that of the present example were effected for the comparative porous sheet. The results are shown in FIGS. 21 and 22. In FIG. 21, Curve (A) shows the variation of temperature at the center portion of the porous sheet of the present Example and Curve (B) shows that of the Comparison Example. As seen by Curve (A), the temperature of the porous sheet was rapidly lowered within about 23 minutes and reached an equilibrium temperature of about 22°C. Compared with this, as seen by Curve (B), the porous sheet could not reach the equilibrium temperature even after washing for more than 75 minutes.

In FIG. 22, Curve (C) shows the variation in pH for the center portion of the porous sheet of the present example and Curve (D) shows that of the Comparison Example. It is obvious from Curve (C) that the pH rapidly increased to about 6.6 to 6.7 within about 30 minutes. However, in the case of Curve (D), the pH did not reach 6.6 to 6.7 even after washing for more than 75 minutes.

The porous sheets of the present example and Comparision Example were subjected to an iodimetry test to detect starch in the porous sheet. In the present example, there was no response to the iodimetry test after washing for only 25 minutes. In the case of the Comparison Example, it took 90 minutes to wash the comparative porous sheet until it showed no response to the iodimetry.

EXAMPLE 13

The same procedure as that of Example 12 was repeated except that the reaction liquid material was fed onto the reaction trough at a thickness of 280 mm and a washing apparatus as shown in FIG. 20 was used. In the washing step, the porous sheet was compressed to one half the original volume under a pressure of 150 to 200 g/cm², and washing water of 20°C was applied onto the porous sheet at a gauge pressure of 2 kg/cm². Before compression the porous sheet was washed by showering water onto the upper surface thereof for about 10 minutes. The temperature of the porous sheet at a center portion thereof was rapidly lowered to 22°C within 25 to 30 minutes. The pH of the porous sheet at the center portion thereof reached 6.6 to 6.7 within about 35 minutes. Also, it was observed that no response to the iodimetry could be seen after washing for about 30 minutes.

What we claim is:

1. An apparatus for continuously manufacturing polyvinyl acetal porous material comprising, in combination, a conveyer chain circulating along a closed path;

a plurality of U-shaped unit members secured to the conveyer chain and joinable with each other to form a horizontal reaction trough at a portion of the closed path, each U-shaped unit member being provided with an inner bottom and a pair of inner side walls made of an insulating material on which walls at least one pair of electrodes facing each other are disposed;

a feed conduit connected to a reaction liquid material supply source and opening at an entrance end portion of the reaction trough;

a plurality of pairs of brushes in slidable contact with the electrodes of the U-shaped unit members arriving at the entrance portion of the reaction trough, and;

means for applying a voltage to the brushes, connected to an electric power source.

2. An apparatus as claimed in claim 1, wherein a preheating apparatus is inserted between the feed conduit and the reaction liquid material supply source, the preheating apparatus being provided with at least one pair of electrodes connected to a voltage applicator and facing each other through a passage for the reaction liquid material flow.

3. An apparatus as claimed in claim 2, wherein a stirrer is disposed in the passage for the reaction liquid material flow.

4. An apparatus as claimed in claim 1, wherein said voltage applicator comprises at least two voltage sources of different voltages and at least two pairs of outermost brushes connected to the lowest voltage source and at least one pair of central brushes connected to the highest voltage source.

5. An apparatus as claimed in claim 1, wherein all the pairs of brushes are connected to the same voltage source.

6. An apparatus as claimed in claim 1, wherein a housing containing the apparatus is provided with means for heating the apparatus.

7. An apparatus as claimed in claim 1, wherein a guide plate is disposed under the portion of the conveyer carrying the reaction trough, a pair of guide members extend outwardly from the side wall of the unit members, and a plurality of guide rollers are arranged at positions at which the guide members of the unit members forming the reaction trough come into contact with the guide rollers, and are pushed downwardly, whereby the unit members forming the reaction trough are prevented from up-and-down movement.

8. An apparatus as claimed in claim 1, wherein an endless polar belt is disposed above the reaction trough and circulates along the reaction trough while coming into contact with the upper surface of the reaction liquid material in the reaction trough.

9. An apparatus as claimed in claim 1, wherein means for showering an aftertreating liquid is disposed above an exit portion of the reaction trough.

10. An apparatus as claimed in claim 1, wherein an aftertreating bath is disposed downstream of the reaction trough to immerse the resultant porous material in an aftertreating liquid contained therein.

11. An apparatus as claimed in claim 1, wherein means for washing the porous material are disposed downstream of the reaction trough.

12. An apparatus as claimed in claim 11, wherein the washing means is provided with a bath for containing a washing liquid, at least one compressing plate, movable up and down, and at least one suction box facing the compressing plate and connected to the bath through a punched plate or net and to a suction pump.

13. An apparatus as claimed in claim 11, wherein the washing means is provided with a bath for containing a washing liquid, at least one conveyer roll for conveying the porous material disposed in the bath, a compressing plate movable up and down, at least one guide roller secured on the lower surface of the compressing plate, and a suction box facing the compressing plate and connected to the bath through a punched plate or net and to a suction pump.

14. An apparatus as claimed in claim 11, wherein said washing means is provided with at least one rotatable compressing roller movable up and down, an endless conveyer belt circulating below the compressing roller and having numerous apertures, at least one suction box facing the compressing roller, coming into slidable contact with the conveyer belt and connected to a suction pump.

15. An apparatus as claimed in claim 11, wherein said washing means is provided with at least one rotatable compressing roller movable up and down, at least one rotatable suction roller facing the compressing roller and having, on its periphery, numerous apertures, and a suction box contained in the suction roller, coming into slidable contact with the inside surface of the periphery and connected to a suction box.

16. An apparatus as claimed in claim 11, wherein said washing means is provided with a compressing plate movable up and down, having a cavity formed at a lower face of the compressing plate, means for feeding a washing liquid to the cavity, and a punched plate or net covering the cavity, through which punched plate or net the washing liquid flows.

17. An apparatus as claimed in claim 16, wherein said washing means is further provided with an endless conveyer circulating below said compressing plate and having numerous apertures.

18. An apparatus as claimed in claim 1, wherein the U-shaped unit member has two insulating packings secured on a front face and a back face thereof, whereby the U-shaped unit member is joined hermetically with the adjacent foregoing and following unit members.

* * * * *